United States Patent [19]

Noggle

[11] Patent Number: 4,791,765
[45] Date of Patent: Dec. 20, 1988

[54] SYNTHETIC MATERIAL STRUCTURAL BODY PANEL

[75] Inventor: Francis E. Noggle, Royal Oak, Mich.
[73] Assignee: Ford Motor Company, Dearborn, Mich.
[21] Appl. No.: 334,675
[22] Filed: Dec. 28, 1981
[51] Int. Cl.[4] .................. E04C 2/32; B23K 11/10; B32B 27/06
[52] U.S. Cl. .................. 52/309.2; 52/787; 219/86.1; 219/91.2; 428/614
[58] Field of Search .............. 52/309.2, 716, 787, 52/182, 309.16, 792, 823, 309.14; 156/292, 219, 242; 428/614; 219/91.2, 86.1

[56] References Cited

U.S. PATENT DOCUMENTS

| | | | |
|---|---|---|---|
| 1,767,465 | 6/1930 | Ledwinka | 219/86.1 |
| 3,110,064 | 11/1963 | Koontz | 52/787 |
| 3,162,279 | 12/1964 | Leininger et al. | 52/747 |
| 3,213,570 | 10/1965 | Abramson, Jr. | 52/309.2 |
| 3,256,669 | 6/1966 | Seivert | 52/792 |
| 3,344,504 | 10/1967 | Bolesky | 52/787 |
| 3,978,632 | 9/1976 | Ansted | 52/787 |
| 4,056,878 | 11/1977 | Woodley | 52/787 |
| 4,232,496 | 11/1980 | Warkentin | 52/787 |

FOREIGN PATENT DOCUMENTS 340655 1/1931 United Kingdom .................. 52/792
668585 of 1952 United Kingdom .................. 52/787

OTHER PUBLICATIONS

Polyesters & Their Applications; Bjorksten Research Labs, Inc.; 1956 (pp. 76–80).
Engineering Materials Handbook; 1958; (pp. 35–36; section 29).

Primary Examiner—Michael Safavi
Attorney, Agent, or Firm—Peter D. McDermott; Roger L. May

[57] ABSTRACT

A synthetic material structural body panel is provided which comprises synthetic material suitable for use as structural body panel, for example, as a package tray in an automotive vehicular structural body, wherein an aperture extends through the synthetic material panel, and further comprising a metal attachment plate fixedly engaging the synthetic material and spanning the aperture. The invention further provides a method of making a structural body comprising a synthetic material structural body panel according to the invention. The invention further provides a joint between a synthetic material structural body panel of the invention and another structural body panel, which joint comprises a metal attachment plate as described above, and means such as spot welding, riviting, etc. securing the metal attachment plate to the other structural body panel.

28 Claims, 3 Drawing Sheets

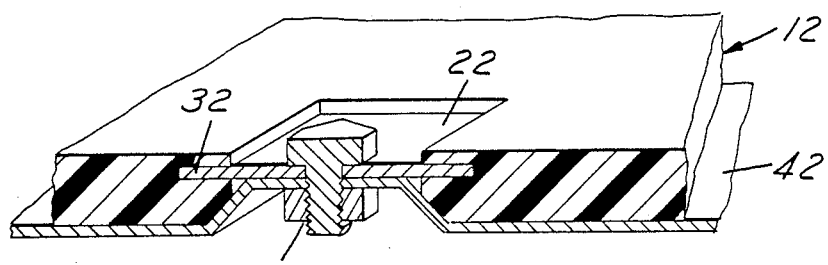
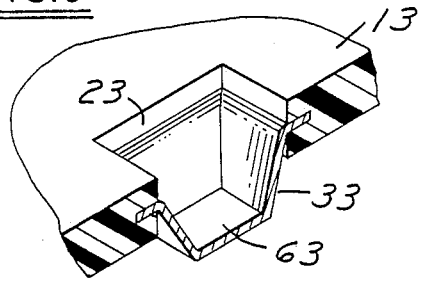
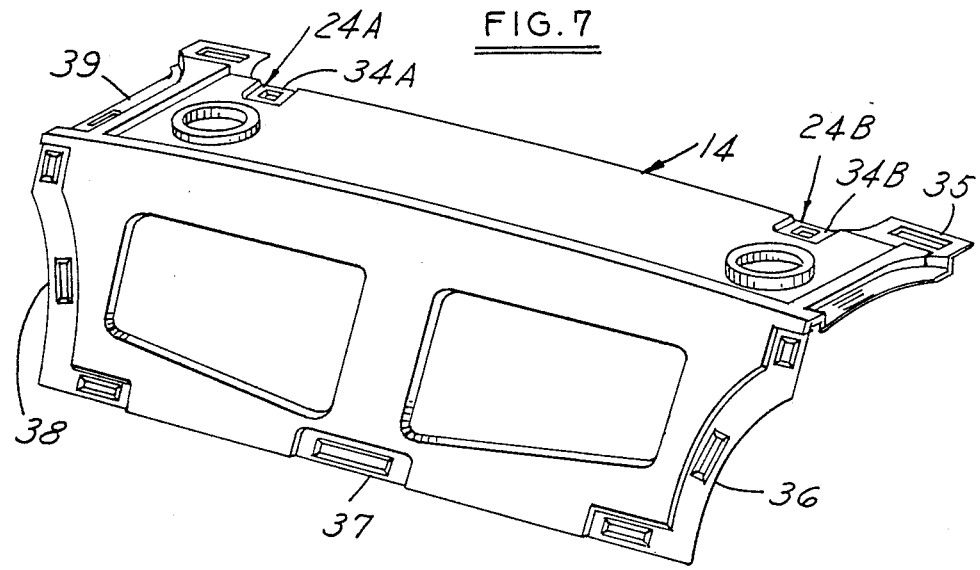

SYNTHETIC MATERIAL STRUCTURAL BODY PANEL

INTRODUCTION

This invention relates to a novel structural body panel comprising synthetic material, to methods of making a structural body comprising such novel synthetic material body panel integrally attached to another structural body panel, and to the joint integrally attaching such synthetic material structural body panel to another structural body panel.

Synthetic material such as, for example, molded glass fiber reinforced laminate and reinforced phenolic plastic in sheet or panel form has achieved wide and growing acceptance for use in the fabrication of automotive vehicle bodies and like structural bodies. The desirability of these materials stems, in part, from their resistance to corrosion and from their weight advantage over the sheet metal structural body panels which they replace. The use of such materials as structural body panels in high volume production line applications, however, presents certain difficulties. Specifically, while sheet metal panels can be joined rapidly by spot welding techniques, synthetic material panels cannot be joined directly to sheet metal or to other plastic panels by such rapid production techniques. In the past, a common practice has been to adhesively bond the synthetic material panel to the sheet metal panel or to the second synthetic material panel. Adhesive bonding, however, is more costly than spot welding due both to the adhesive material cost and to the increased fabrication time required to form the adhesive bond. Accordingly, adhesive bonding techniques often cannot economically compete with spot welding techniques, for example, in the high volume production of automotive vehicle or like structural bodies.

In U.S. Pat. No. 3,162,279 to Leininger, et al synthetic material panels were disclosed, which panels were suitable for joinder to sheet metal panels. It was disclosed to use synthetic material panels having a pre-attached metal welding strip which would permit the panels to be joined to sheet metal panels by spot welding or other production line technique ordinarily used to join sheet metal panels. The metal welding strip was attached at the periphery of the synthetic material panel as a flange. That flange could be positioned over a peripheral flange provided on an adjacent sheet metal panel. These overlapping flanges could then be attached by routine spot welding or other attachment techniques.

The synthetic material panel of Leininger et al, while useful in certain applications, presents serious disadvantages where the synthetic material panel and the joint between the synthetic material panel and the sheet metal panel must withstand high mechanical loads in their use environment. For example, it has been found to be unacceptable for use as an automotive vehicle structural body panel such as, for example, as a package tray or like load bearing panel. In particular, it has been found that under stress the pre-attached metal welding strips of the Leininger et al invention are subject to detachment, not from the sheet metal panel to which it is welded, but rather from the synthetic material panel. That is, detachment is commonly due to failure of the adhesive joint between the metal welding strip and the peripheral portion of the synthetic material panel. It has been observed that, typically, detachment occurs through a so-called peel mode, that is, by separation of the adhered surfaces starting at one edge of the adhesive joint and progressing through the entire adhesive joint. In particular, for example, detachment by a peel mode has been found to be a serious shortcoming of the Leininger et al approach where the synthetic material panel is placed under significant loads in its use environment and such detachment has been a most serious problem impeding efforts to employ synthetic material structural body panels in automotive vehicles structural bodies. Accordingly, use of a metal welding strip adhesively joined to the synthetic material panel has often proven unacceptable for use in joining synthetic material panels such as automotive vehicle structural body panels to sheet metal structural body panels.

A further disadvantage of the Leininger et al synthetic material panel lies in the fact that attachment of one such panel to another structural body panel must be made at the periphery of each panel. While this may not be a significant disadvantage for some applications, for many applications, for example, for use as automotive vehicle structural body panels and the like, one body panel must often be attached to a second body panel at one or more locations which are far removed from the periphery of the panels.

Accordingly, it is an object of the present invention to provide a synthetic material structural body panel suitable for integral attachment to one or more structural body panels such as a sheet metal panel to form therewith a structural body, for example, an automotive vehicle structural body.

It is another object of this invention to provide a synthetic material structural body panel which can be attached to sheet metal structural body panel at one or more locations using spot welding or other conventional techniques suited to high volume production, for example, in the production of automotive vehicle structural bodies. In this regard, it is an object of the invention to provide a joint between synthetic material structural body panel and sheet metal structural body panel which is suitable for use even when the synthetic material structural body panel and the joint between same and sheet metal structural body panel will be subjected to high stress or weight loads in its use environment, for example, in automotive vehicle structural bodies and the like. In particular, it is an especially significant object of this invention to provide such joint which does not detach, even by a peel mode, under such stress or weight load.

It is another object of the invention to provide a synthetic material structural body panel which can be attached to sheet metal structural body panel at locations other than (or in addition to) at the periphery of each.

It is another object of the invention to provide a method of making a structural body incorporating synthetic material structural body panel with or without sheet metal structural body panel.

It is another object of the invention to provide a joint between a synthetic material structural body panel and a sheet metal structural body panel, which joint is not subject to detachment by a peel mode.

Other objects, advantages and features of the present invention will be apparent from the further description of the invention which follows.

In the accompanying drawings forming a part of this specification,

FIG. 5 is a cross-sectional view of yet another embodiment of the synthetic material structural body panel of the invention, shown attached to sheet metal structural body panel by a method other than welding.

FIG. 6 is a cross-sectional view of yet another embodiment of the synthetic material structural body panel of the invention.

FIG. 7 is a perspective view of a somewhat simplified package tray for an automotive vehicle, which comprises a synthetic material structural body panel according to the present invention.

SUMMARY OF THE INVENTION

Figure 1:
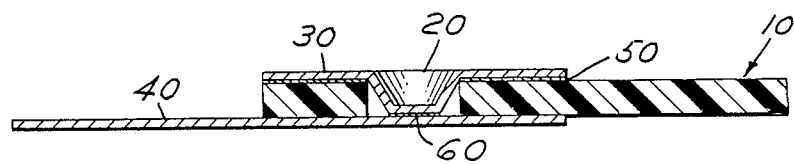
FIG. 1 is a cross-sectional side view of a synthetic material structural body panel according to the invention, shown attached to a sheet metal structural body panel.

The present invention provides a structural body panel suitable for attachment to a second structural body panel, which comprises a panel comprising synthetic material, having an aperture extending through said synthetic material, and a metal attachment plate fixedly engaging said synthetic material and spanning said aperture. More particularly, the invention provides a structural body panel which comprises synthetic material suitable for use as structural body panel such as, for example, for use integrally attached to a second structural body panel. The metal attachment plate is bonded to the surface of the synthetic material panel over the aperture or is embedded in the synthetic material panel so positioned as to span the aperture and extend into the synthetic material immediately surrounding the aperture. While such second structural body panel can comprise, for example, sheet metal or another synthetic material structural body panel according to the invention, for convenience in the present description, it will in certain instances be taken to be a sheet metal structural body panel.

A first surface of the synthetic material structural body panel of the invention provides one or more areas suitable to be positioned adjacent the second (e.g., sheet metal) structural body panel. The synthetic material panel has an aperture within such area(s), which aperture extends through the synthetic material panel. The metal attachment plate fixedly engages the synthetic material panel so as to span the aperture either over or within the aperture, but remote from that surface which is to be positoned adjacent the second panel. Thus, upon attachment of the metal attachment plate to the second structural body panel, a portion of the synthetic material panel is sandwiched between the metal attachment plate and the second panel. Thus, the metal attachment plate can be, for example, adhesively bonded to the opposite surface of the synthetic material panel so as to cover the aperture or can be molded into the synthetic material panel so as to span the aperture. In either case, both sides of the metal attachment plate, at least in part, are exposed at the aperture.

Each attachment plate can provide one or more attachment locations, for example, one or more locations where a spot weld can be made. Typically, the attachment plate will be offset through the aperture so as to be substantially flush with the surface of the sheet metal or other structural body panel to which the synthetic material structural body panel is to be attached.

A most advantageous embodiment of the present invention is that of a package tray for an automotive vehicle. A package tray forms a load-bearing structural body panel in an automotive vehicle and thus would typically be integrally attached to other panels of the vehicle structural body. Preferably, such attachment is by welding to the other structural body panels (e.g. sheet metal panels) of the vehicle structural body. Accordingly, a first surface of a package tray comprising a synthetic structural body panel according to the present invention provides one or more areas suitable to be positioned adjacent another structural body panel. Each such attachment area has an aperture extending through the synthetic material panel and a metal attachment plate, preferably a weldable steel attachment plate, fixedly engaging the synthetic material structural body panel over or within each such aperture, but remote from the aforesaid first surface which is to be positioned adjacent the other structural body panel to which the package tray is to be attached. Preferred synthetic material for a package tray according to this invention is, for example, glass fiber reinforced thermoset polyester resin, or the like.

According to a method aspect of the present invention, a method is provided of making a structural body comprising a synthetic material structural body panel and at least one other structural body panel integral therewith. The method of the invention comprises providing a synthetic material structural body panel according to the invention and attaching a metal attachment plate thereof to a second structural body panel. The attachment can be by any suitable means known to the skilled of the art such as, for example, by spot welding.

A particularly significant embodiment of the method aspect of the present invention provides a method of making the structural body of a passenger vehicle, which method comprises providing a package tray as described above and a second structural body panel, and attaching one or more metal attachment plates of the package tray each to the second structural body panel.

Another aspect of the present invention provides a joint between a synthetic material structural body panel and a second structural body panel, for example, a sheet metal structural body panel or another synthetic material structural body panel according to the invention. Such joint comprises a metal attachment plate fixedly engaging the synthetic material structural body panel over or within an aperture as decscribed above, corresponding attachment area of the second structural body panel, and means securing the metal attachment plate to such corresponding attachment area. Any suitable attachment means can be used, including many well known to he skilled of the art such as, for example, spot welding, rivet, nut and bolt, and the like.

A particular embodiment of this aspect of the invention provides a welded joint between a package tray according to the invention as described above and sheet metal structural body panel. Such welded joint comprises a weldable metal attachment plate fixedly engaging the synthetic material package tray over or within a aperture extending from a first surface of the package tray adjacent the sheet metal structural body panel through the synthetic material panel of the package tray. The metal attachment plate engages the synthetic material panel of the package tray remote from that first surface. The weldable metal joint further comprises a corresponding attachment area of the sheet metal structural body panel and a metal weld securing the metal attachment plate to the attachment area of the sheet metal structural body panel.

The structural body panel and other aspects of the present invention enable the use of synthetic material structural body panels in applications in which they would otherwise be unacceptable. More specifically, the structural body panel of the present invention will not detach from other structural body panels, for example, sheet metal structural body panels to which they are attached, for example, by spot welding, under stress or weight loads which would cause previously known synthetic material panels to detach, especially by a peel mode of detachment.

DETAILED DESCRIPTION OF THE INVENTION

The structural body panel of the present invention can comprise any synthetic material suitable for use as structural body panel such as, for example, plastic including both thermoplastic and thermoset plastic, either non-reinforced or fiber reinforced. The material which is preferred for the synthetic material structural body panel will depend in large part on the particular application for which it is intended. Typical materials which may be preferred for use in automotive vehicle structural body panels include, for example, fiber reinforced thermoset polyester and ABS plastics. Suitable commercially available fibers will be apparent to the skilled of the art in view of the present disclosure and include, for example, glass roving which is generally preferred, Kevlar (trademark of duPont de Nemours, Inc., Willmington, Del.) fibers, carbon fibers and the like or a mixture of any of them. Other suitable materials will be readily apparent to the skilled of the art in view of the present disclosure.

The panel need not be either flat or of uniform thickness. The synthetic material can be formed or shaped into the desired configuration for the structural body panel according to methods well known to those skilled in the art. Suitable techniques include, for example, injection molding, resin transfer molding and compression molding. The choice of molding technique will depend, in part, on the synthetic material employed. Thus, for example, compression molding is typically preferred for sheet molding compound (SMC) comprising fiber reinforced thermoset polyester.

Where the area(s) is (are) known, at which a synthetic material structural body panel is to be attached to another structural body panel, the aperture which extends through the synthetic material panel can be provided during the initial manufacture of the synthetic material panel. Thus, for example, the aperture can be provided by appropriate design of the tooling used in molding the synthetic material panel.

The metal attachment plate is fixedly engaged to the synthetic material panel so as to span the aperture extending through the synthetic material panel, that is, it lies over or within the aperture. It is a significant aspect of the present invention that the metal attachment plate engage the synthetic material panel remote from that surface of the synthetic material panel which is to lie adjacent the other structural body panel to which the synthetic material structural body panel is to be attached. Thus, when the metal attachment plate is welded (or otherwise attached) to the other panel, a portion of the synthetic material surrounding the aperture is sandwiched between a portion of the metal attachment plate and a portion of the other panel. The metal attachment plate can be adhesively bonded or otherwise fixedly engaged to the synthetic material panel so as to cover the aperture. Alternately, the metal attachment plate can be molded into the synthetic material panel intermediate the upper and lower surfaces thereof so as to lie substantially within the synthetic material panel and be exposed, in part, on each side at the aperture. Whether it is preferred that the metal attachment plate be molded into the synthetic material or adhesively or otherwise bonded to the surface of the synthetic material will depend upon the intended use of the panel. Generally, however, it is preferred that the metal attachment plate be molded into the synthetic material intermediate the upper and lower surface thereof, sine it then is held positively in place and it presents no edge surfaces against which pressure could be placed which might cause the metal attachment plate to detach from the surface of the synthetic material. This latter advantage could be provided alternately by providing a recess in the surface of the synthetic material panel into which the metal attachment plate could be placed and adhesively or otherwise bonded. The molded-in technique provides an additional advantage, howver, in that the cost of adhesive is avoided and the risk of failure of the adhesive is avoided.

Suitable adhesives for adhesively bonding the metal attachment plate to the surface of the synthetic material structural body panel include many well known to the skilled of the art such as, for example, a one component or two component structural urethane adhesive, for example, PLIOGRIP (trademark, Goodyear Tire & Rubber Co., Ashland, Ohio), or a two component structural acrylic adhesive such as those available, for example, from Hughson Chemicals, Lord Corporation, Erie, Pennsylvania. The most preferred adhesive will depend, in part, upon the synthetic material, the cost of the adhesive, the intended use of the synthetic material structural body panel and the environment to which the synthetic material structural body panel is likely to be exposed during its inended use.

The choice of suitable metal for the metal attachment plate depends in large part upon the application and use environment intended for the synthetic material structural body panel. Where the synthetic material structural body panel is to be welded to the other structural body panel, the metal attachment plate would comprise weldable metal such as, for example, sheet steel or other weldable metals known to the skilled of the art. The metal attachment plate need not be of a weldable metal if the intended means of attachment to the second structural body panel is, for example, by adhesive bonding, riviting, bolting or the like. Where the synthetic material structural body panel of the invention is used in an automotive vehicle body, it is preferred that the metal attachment plate be welded to the other structural body panel(s). Spot welding is a highly advantageous means of attachment between body panels in the structural body of an automotive vehicle, since it is extremely fast, very low cost, provides an extremely durable bond, and is already in common use in the automotive vehicle construction industry. For these reasons, the synthetic material structural body panel of the present invention is seen to be far superior to synthetic material structural body panels which do not comprise a metal attachment plate and must therefore be adhesively bonded to other structural body panels.

A generally preferred configuration for the metal attachment plate is such that a portion thereof lies substantially flush against the surface of the other structural body panel at a position suitable for attachment of the two panels. Typically, that portion of the metal attachment plate lying over or within the aperture in the synthetic material panel can be offset toward the surface of the other structural body panel. Where the attachment surface area of the synthetic material structural body panel lies substantially flat against the other structural body panel, the metal attachment plate would, therefore, be offset so as to be substantially flush with the attachment surface area of the synthetic material panel. In an alternate embodiment, a suitable portion of the metal attachment plate covering or lying within the aperture can be offset towards and beyond that surface of the synthetic material structural body panel which is intended to lie towards the other structural body panel. This would be preferred, for example, where the synthetic material structural body panel was to be spaced from the other structural body panel when attached thereto. Alternately, the metal attachment plate can be offset away from the surface of the synthetic material structural body panel which is intended to lie towards the other structural body panel. This would be the case, for example, where the surface of the other structural body panel to which the metal attachment plate was to be attached was also offset in that direction. While only a portion of the metal attachment plate sufficiently large to accommodate the attachment means need be offset, it should be recognized that substantially the entire area of the metal attachment plate covering or lying within the aperture can be offset and this may be preferred where multiple attachments are to be made between that metal attachment plate and the corresponding attachment area of the other structural body panel. In any event, a sufficient portion of the metal attachment plate should be offset to accommodate the intended attachment means. Thus, for example, where spot welding is intended, a portion of the metal attachment plate sufficient to accommodate the one or more intended weld spots would be offset. It should also be recognized that more than one metal attachment plate can be employed in any given structural body panel. Also, a single metal attachment plate can extend so as to cover or span more than one separate aperture.

It should be obvious from the discussion above that the metal attachment plate and the aperture extending through the synthetic material panel can have any configuration suitable to the intended use of the synthetic material structural body panel. Thus, for example, where it is desired that the synthetic material structural body panel be attached to another structural body panel at such a location that the attachment surface area of the synthetic material structural body panel is curved rather than flat, the metal attachment plate can simply be provided with matching curvature. In this regard, it is within the skill of the art to mold into a synthetic material panel a metal attachment plate having a curvature corresponding to or matching that of the synthetic material panel at the location into which it is to be molded. Likewise, a metal attachment plate to be adhesively bonded to a curved surface of a synthetic material structural body can have a corresponding or matching curvature.

Figure 2:
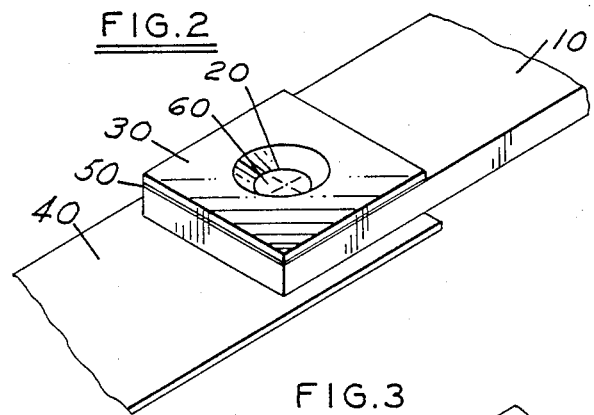
FIG. 2 is a perspective view of the embodiment of FIG. 1.

Referring now to the drawings, FIGS. 1 and 2 illustrate a cross-sectional side view and a perspective view, respectively, of a synthetic material structural body panel according to the invention, welded to a sheet metal structural body panel. More specifically, synthetic material structural body panel 10 has aperture 20 extending through the synthetic material structural body panel at the area where the metal attachment plate 30 is attached to the sheet metal structural body panel 40. Metal attachment plate 30 is bonded by adhesive 50 to the outer surface of the synthetic material panel. It is offset through the aperture to provide a flat area 60 substantially flush with the bottom of the synthetic material structural body panel so as to lie against or in close proximity to the surface of the sheet metal panel. In this embodiment the metal attachment plate is situated at the periphery of the synthetic material structural body panel. It should be noted that the metal attachment plate and the sheet metal panel sandwich a portion of the synthetic material between them. Thus, the adhesive bond between the metal attachment plate and the synthetic material panel is not alone relied on to withstand the stresses and pressures encountered during use of the structural body comprising these structural body panels.

Figure 3:
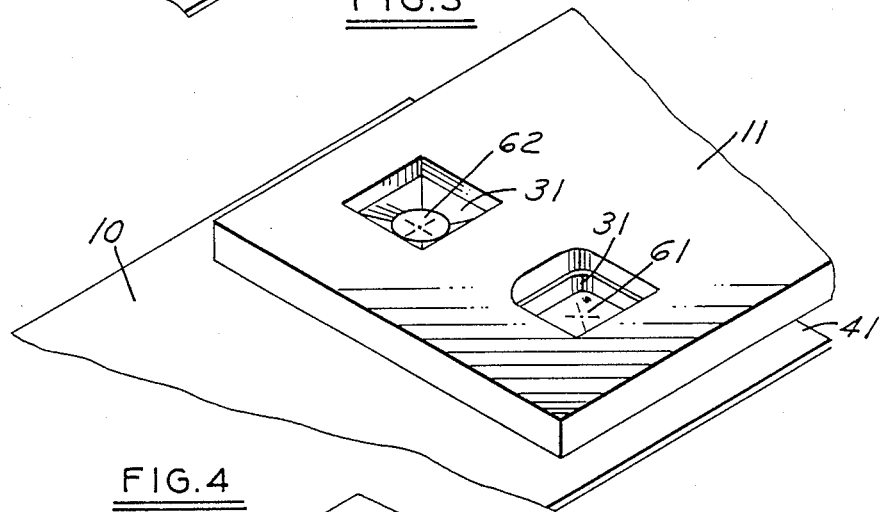
FIG. 3 is a perspective view of another embodiment of the synthetic material structural body panel of the invention, shown attached to a sheet metal structural body panel at multiple locations which are remote from the periphery of the panels.
Figure 4:
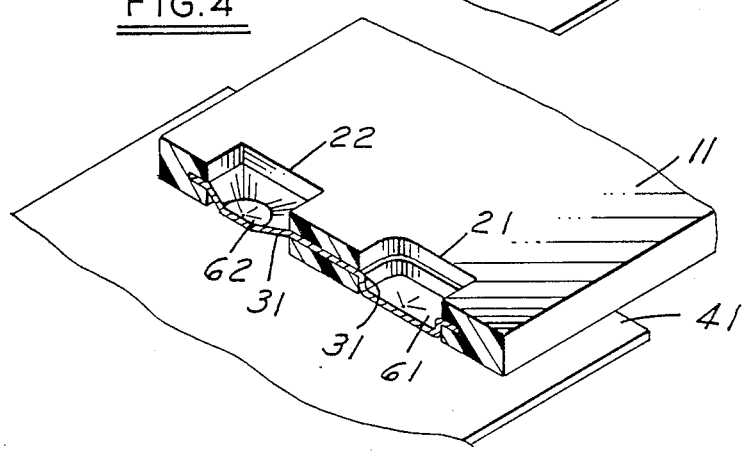
FIG. 4 is a fragmentary, cross-sectional view of the embodiment of FIG. 3 of the synthetic material structural body panel of the invention, shown attached to sheet metal structural body panel.

FIGS. 3 and 4 illustrate an alternate embodiment of the invention. Synthetic material structural body panel 11 is shown positioned over another structural body panel, that is, sheet metal panel 41. In this embodiment the metal attachment plate 31 is molded into the synthetic material structural body panel intermediate the lower surface of the synthetic material panel, which lies adjacent the other structural body panel, and the upper surface of the synthetic material panel. Two apertures 21 and 22 extend through the synthetic material panel. Aperture 21 has a irregular outline whereas aperture 22 is substantially square. A single metal attachment plate 31 spans both these apertures. In each case, the metal attachment plate is offset towards the sheet metal panel so as to provide a substantially flat area lying against or in close proximity to the surface thereof. In the case of aperture 21, substantially the entire area of the metal attachment plate exposed by that aperture is offset. Thus, it provides a relatively large area 61 suitable to accommodate attachment means between it and the sheet metal panel. In the case of aperture 22, a lesser potion of the exposed metal attachment plate is offset toards the sheet metal panel and thus provides a relatively smaller area lying adjacent the surface of that other structural body panel. In the embodiment of FIGS. 3 and 4 the metal attachment plate is located not at the periphery of the synthetic material structural body panel but rather at an interior portion thereof. As in the case of the preceeding embodiment illustrated in FIGS. 1 and 2, the attachment of metal attachment plate 31 and sheet metal panel 41 will result in a portion of the synthetic material structural body panel being sandwiched between them. Thus, pressures and stresses placed on the synthetic material panel and/or on the attachment between it and the sheet metal panel will not be borne by an adhesive bond to the structural material panel nor by a single flange of a metal attachment plate molded into a peripheral edge of the synthetic material panel. Rather, all or a portion of the metal attachment plate surrounding that portion which is attached to the sheet metal panel is molded into the synthetic material panel. Far greater stresses and pressures can therefore be withstood without detachment of the metal attachment plate from the synthetic material panel.

FIG. 5 illustrates yet another embodiment of the present invention. Synthetic material structural body panel 12 has aperture 22 extending through it. Metal attachment plate 32 is molded into the synthetic material panel intermediate the upper and lower surface thereof so as to span said aperture. This metal attachment plate is substantially flat, that is, it is not offset either towards or away form the surface of the synthetic material panel which is intended to face the other structural body panel 42. In this embodiment the metal attachment plate is shown attached to the other structural body panel by means of a nut and bolt 72. A substantially flat contact is provided between the metal attachment plate and the other structural body panel since the latter is offset into aperture 22 at the area of attachment.

FIG. 6 shows yet another embodiment of the present invention. Synthetic material structural body panel 13 has aperture 23. Metal attachment plate 33 is welded into the synthetic material structural body panels so as to span said aperture. The metal attachment plate is offset through the aperture beyond the lower surface of the synthetic material panel to provide a substantially flat section 63 suitable for attachment to another structural body panel (not shown). This embodiment is suitable where the synthetic material structural body panel is intended to be spaced from the other structural body panel upon attachment of the latter to the metal attachment plate.

Figure 8:
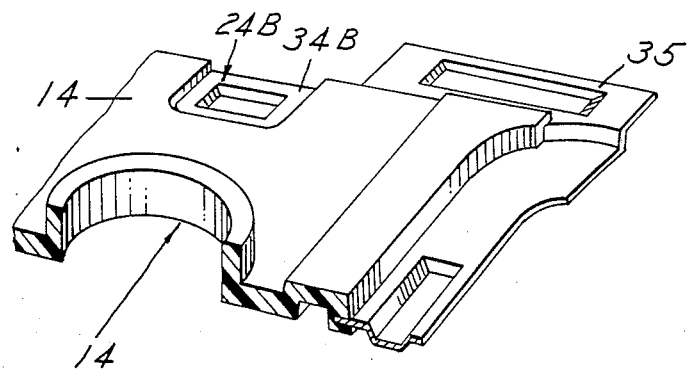
FIG. 8 is a fragmentary perspective view of the right-hand upper corner portion of the package tray illustrated in FIG. 7.
Figure 9:
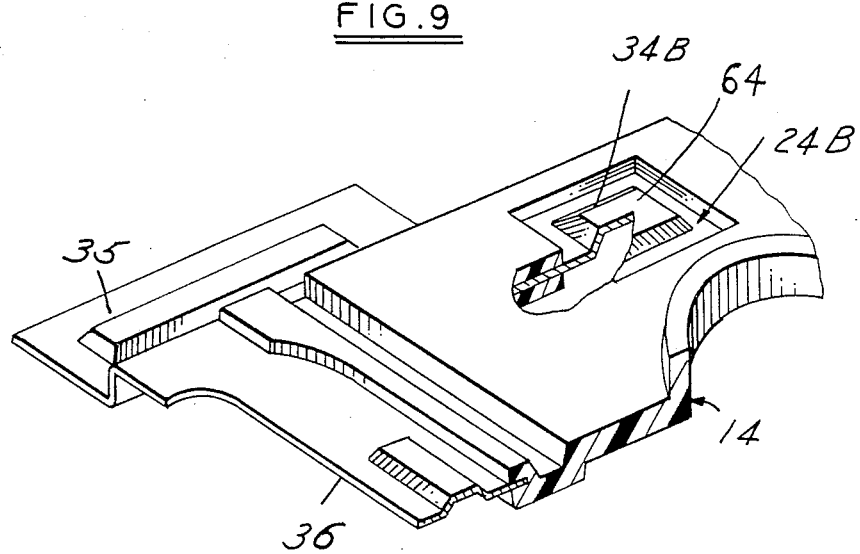
FIG. 9 is a fragmentary perspective view of the underside of the corner portion illustrated in FIG. 8.

FIGS. 7, 8 and 9 illustrate a somewhat simplified package tray 14 suitable for use in an automotive vehicle structural body, which package tray comprises a synthetic material structural body panel according to the present invention. The synthetic material structural body panel 14 has metal attachment plates 34A and 34B spanning apertures 24A and 24B, respectively. The package tray further comprises metal attachment plates 35 through 39. Metal attachment plates 34A and 34B are molded into the synthetic material structural body panel intermediate a lower surface of the synthetic material panel and an upper surface of that panel. Referring particularly to the enlarged view of FIG. 9, the metal attachment plate 34B is seen to be offset through the aperture to provide a flat surface 64 suitable for attachment to another structural body panel (not shown). In this embodiment, the metal attachment plate is situated at the periphery of the synthetic material structural body panel. In accordance with the invention, the metal attachment plates 34A and 34B each will sandwich a portion of the synthetic material between itself and the second structural body panel to which they are attached.

The synthetic material structural body panel of the present invention provides significant advantages not heretofore achieved in the art. A first, highly significant advantage stems from the fact that the attachment of the metal attachment plate of the synthetic material structural body panel to the other structural body panel acts to strengthen and secure its engagement to the synthetic material structural body panel. That is, when the metal attachment plate is attached to the other structural body panel, the synthetic material lying under the metal attachment plate is sandwiched between the metal attachment plate and the other structural body panel. Unlike prior synthetic material structural body panels employing an attached metal plate for welding to another structural body panel, the synthetic material structural body panel of the present invention is highly effective to prevent detachment of the metal attachment plate from the synthetic material. In particular, it is especially effective to prevent failure by a peel mode of the attachment between the synthetic material and the metal plate adhesively bonded along an edge of the synthetic material, wherein the pressure and stress exerted on the structural body panels cause detachment which spreads progressively throughout the attachment.

Another highly significant advantage provided by the present invention is that the metal attachment plate can be provided at any location in the synthetic material structural body panel at which it is desired to make an attachment to another structural body panel. That is, the metal attachment plate of the present invention need not be located at the periphery of the synthetic material panel, but rather can be located remote from the periphery. This is a most significant advance over known synthetic material panels comprising only a metal flange extending outwardly from its peripheral edge. This is especially significant for use of synthetic material structural body panels in the automotive vehicle construction industry, wherein the structural integrity of the vehicle structural body must often be strengthened by attachment of structural body panels to other structural body panels at or more locations remote from the periphery of the panel(s). Accordingly, synthetic material structural body panels of the present invention can be employed in structural applications requiring attachment of the synthetic material panel to other structural body panel at positions other than at the peripheral edge of the synthetic material structural body panel.

In addition, where, according to prior known synthetic material panels, the metal attachment plate is a flange adhesively bonded to the periphery of the synthetic material panel, torsional stresses or pressures occuring during use can cause detachment of the metal flange from the synthetic material panel by a peel mode. According to the unique construction of the synthetic material structural body panel of the present invention, such torsional stress or pressure is resisted not alone by an adhesive bond between the metal attachment plate and the synthetic material, but also by the strength of the attachment between the metal attachment plate and the other structural body panel since a portion of the synthetic material is sandwiched between the metal attachment plate and the other structural body panel. Thus, for example, where the other structural body panel is sheet steel and the attachment between the metal attachment plate and that sheet steel structural body panel is by one or more spot welds, far greater stress or pressure can be borne by the structural body panels without detachment of the synthetic material structural body panel from the metal attachment plate. Obviously, the same principle applies where the attachment between the metal attachment plate and the other structural body panel is by rivit, bolt, or the like. The "sandwich" configuration of the present invention is found to provide greater strength even than prior known synthetic panels wherein the metal plate is molded into the peripheral edge of the synthetic material panel. Thus, according to the present invention, synthetic material structural body panels can now be employed in far more applications than was previously possible and in environments in which they will undergo far greater stress or pressure, particularly torsional stress or pressure, than was heretofore possible.

Particular embodiments of the present invention described above are illustrative only and do not limit the scope of the invention. It will be apparent to the skilled of the art in view of the foregoing disclosure that modification and substitutions can be made other than as herein described without departing from the scope of the invention.

We claim:

1. A structural body panel comprising a first panel comprising synthetic material having an aperture extending entirely through the thickness thereof, and a metal attachment plate molded into said synthetic material spanning said aperture remote from a first surface of said first panel, said metal attachment plate being attached to a second structural body panel adjacent said first surface of said first panel, a portion of said synthetic material of said first panel being sandwiched between said metal attachment plate and said second panel.

2. A structural body panel as in claim 1, wherein a portion of said metal attachment plate exposed through said aperture is offset through said aperture.

3. A structural body panel as in claim 2, wherein said portion of said metal attachment plate is offset through said apeture to be substantially flush with said first surface of said panel.

4. A structural body panel as in claim 1, wherein said second structural body panel comprises sheet metal and said metal attachment plate comprises metal suitable for welding to said sheet metal.

5. A structural body panel as in any one of claims 1 through 4, wherein said synthetic material is thermosetting polyester resin.

6. A structural body panel as in claim 5, wherin said synthetic material is fiber reinforced.

7. A structural body panel as in claim 6, wherein said fiber consists of glass roving.

8. A package tray or an automotive vehicle which comprises a first panel comprising fiber reinforced resin having an aperture extending entirely through the thickness thereof, and a metal attachment plate molded into said fiber reinforced resin and spanning said aperture remote from a first surface of said package tray, said metal attachment plate being attached to a second structural body panel of said vehicle adjacent said first surface of said package tray, a portion of said fiber reinforced resin being sandwiched between said metal attachment plate and said second plate.

9. A package tray as in claim 8, wherein said attachment plate is offset through said aperture.

10. A package tray as in claim 9, wherein a portion of said metal attachment plate exposed through said aperture is offset throught said aperture to be substantially flush with a surface of said fiber resinforced resin panel.

11. A package tray according to any of claims 10 through 10, wherein said resin is thermosetting polyester resin.

12. A package tray according to claim 11, wherein said fiber is glass roving.

13. A method of making a structural body comprising a synthetic material structural body panel and at least a second structural body panel integral therwith, which method comprises:
A. providing a structural body panel comprising synthetic material suitable for use as structural body panel integral with said second structural body panel and having an aperture extending entirely through the thickness therof, and a metal attachment plate spanning said aperture and molded into said synthetic material remote from a first surface of said synthetic material panel;
B. positioning said first surface, at said aperture, adjacent saaid second structural body panel; and
C. attaching said metal attachment plate to said second structural body panel, whereby a portion of said synthetic material panel is sandwiched between said metal attachment plate and said other structural body panel.

14. The method of claim 13, wherein a portion of said metal attachment plate exposed through said aperture is offset through said aperture.

15. The method of claim 14, wherein said offset portion is offset through said aperture so as to be substantially flush with said first surface.

16. The method of claim 13, wherein said second structural body panel comprises sheet metal, said metal attachment plate comprises weldable metal and said attaching step comprises welding.

17. A method of making a structural body of an automotive vehicle comprising (i) sheet metal structural body panel, and (ii) a package tray comprising synthetic material and being integrally welded to said sheet metal structural body panel, which method comprises:
A. providing a package tray comprising a synthetic material panel comprising fiber reinforced resin having an aperture extending entirely through the thickness thereof, and a metal attachment plate spanning said aperture and molded into engaging said panel remote from a first surface of said package tray;
B. positioning said first surface of said package tray at said aperture adjacent said second metal structural body panel; and
C. welding said metal attachment plate of said package tray to said sheet metal structural body panel, whereby a portion of said resin panel is sandwiched between said metal attachment plate and said sheet metal structural body panel.

18. The method of claim 17, wherein a portion of said metal attachment plate exposed through said aperture is offset through said aperture.

19. The method of claim 18, wherein said offset portion is offset thorugh said aperture so as to be substantially flush with said first surface of said package tray.

20. The method of claim 17, wherein said resin consists essentially of thermosetting polyester resin.

21. The method of claim 17, wherein said fiber consists essentially of glass roving.

22. A joint between a first structural body panel and a synthetic material structural body panel, a first surface of which synthetic material structural body panel lies adjacent said first structural body panel, which joint comprises:
a metal attachment plate spanning an aperture extending entirely through said synthetic material and molded into said synthetic material remote from said first surface; and means securing said metal attachment plate to said second structural body panel.

23. A joint according to claim 22, wherein a portion of said metal attachment plate exposed through said aperture is offset through said aperture.

24. A joint as in claim 23, wherein said offset portion is substantially flush with said first surface of said synthetic material structural body.

25. A joint as in claim 22, wherein said second structural body panel comprises sheet metal and said metal attachment plate comprises metal suitable for welding to said sheet metal.

26. A welded joint between a first structural body panel of an automotive vehicle and a package tray of said automotive vehicle, a first surface of which package tray lies adjacent said first structural body panel, wherein said package tray comprises a fiber reinforced resin panel, which welded joint comprises:
  a weldable metal attachment/plate spanning an aperture extending entirely through the thickness of said fiber reinforced resin panel, said metal attachment plate molded into fiber reinforced resin panel remote from said first surface; and
  a metal weld securing said metal attachment plate to said first structural body panel, wherein a portion of said fiber reinforced resin panel is sandwiched between said metal attachment plate and said first structural body panel.

27. The welded joint of claim 26, wherein a portion of said metal attachment plate exposed through said aperture is offset through said aperture.

28. The welded joint of claim 26, wherein said offset portion is substantially flush with said first surface of said fiber reinforced rein panel.

* * * * *